United States Patent [19]
Myers

[11] Patent Number: 6,145,894
[45] Date of Patent: Nov. 14, 2000

[54] PUSH-PULL CONNECTOR AND AIR SPRING-COMBINATION

[75] Inventor: James R. Myers, Indianapolis, Ind.

[73] Assignee: Bridgestone/Firestone, Inc., Akron, Ohio

[21] Appl. No.: 09/173,895

[22] Filed: Oct. 16, 1998

[51] Int. Cl.$^7$ .................................................. F16L 21/06
[52] U.S. Cl. ......................... 285/322; 285/323; 285/243; 267/64.27; 267/64.24
[58] Field of Search .................................. 285/322, 323, 285/243; 267/64.24, 64.27

[56] References Cited

U.S. PATENT DOCUMENTS

| | | | |
|---|---|---|---|
| 2,989,301 | 4/1961 | Johannsen | 267/64.24 |
| 3,033,554 | 5/1962 | Francis | 267/64.24 |
| 3,081,075 | 3/1963 | Selman | 267/64.24 |
| 3,727,899 | 4/1973 | Pemberton . | |
| 4,906,028 | 3/1990 | Yokomatsu et al. . | |
| 5,090,741 | 2/1992 | Yokomatsu et al. . | |
| 5,125,694 | 6/1992 | Gobbi . | |
| 5,174,611 | 12/1992 | Byrd et al. . | |
| 5,230,539 | 7/1993 | Olson . | |
| 5,468,028 | 11/1995 | Olson . | |
| 5,474,336 | 12/1995 | Hoff | 285/243 |
| 5,511,830 | 4/1996 | Olson | 285/243 |
| 5,584,513 | 12/1996 | Sweeny et al. . | |
| 5,681,061 | 10/1997 | Olson . | |
| 5,683,120 | 11/1997 | Brock | 285/322 |
| 5,722,696 | 3/1998 | Taneya . | |

Primary Examiner—Lynne H. Browne
Assistant Examiner—Aaron Dunwoody
Attorney, Agent, or Firm—Michael Sand; D. A. Thomas; John M. Vasuta

[57] ABSTRACT

An air spring having a flexible sleeve is mounted between a pair of movable support components to maintain the components in a spaced relationship. The flexible sleeve has a hollow interior which forms an internal fluid chamber. A connector is mounted in one end of the sleeve and receives a tube for controlling the flow of fluid into and out of the chamber. The connector has a main body molded into the sleeve end and a collet member telescopically rotatably mounted in a hollow interior of the main body. The collet member has a plurality of flexible fingers which grip the end of a tube when inserted therein and have one-way barbs which grip to tube to prevent it from being pulled out once it is inserted within the connector. An elastomeric seal is mounted within the body to provide a fluid seal between the tube and body interior.

15 Claims, 3 Drawing Sheets

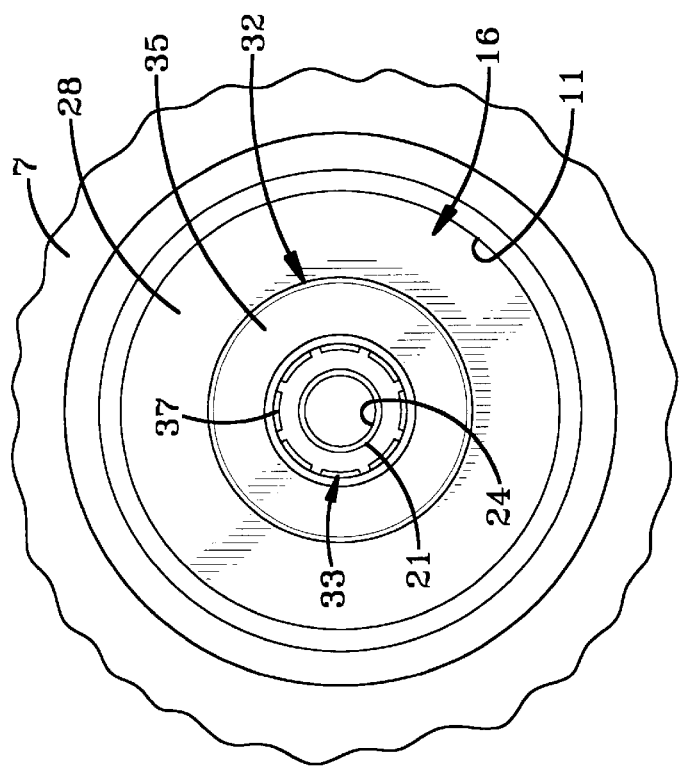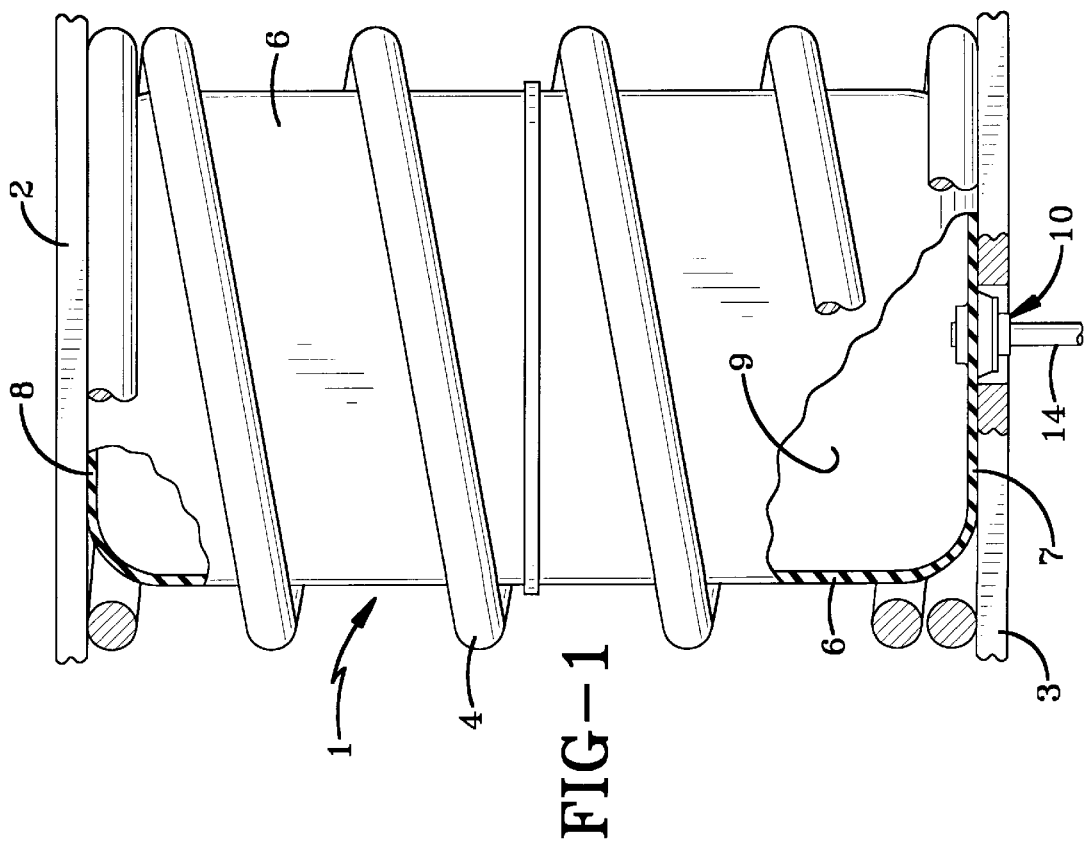

PUSH-PULL CONNECTOR AND AIR SPRING-COMBINATION

BACKGROUND OF THE INVENTION

1. Technical Field

The invention relates to suspensions and in particular to an air spring suspension for absorbing road shock exerted on a vehicle or other equipment and/or for maintaining a vehicle body level with respect to the axles. More particularly, the invention relates to a combination of a connector which is mounted in the air spring for connecting to a tube which supplies fluid into the air spring. Even more particularly the invention relates to a push-pull connector mounted in the air spring which enables the tube to be pushed into the connector and then pulled slightly outwardly to seat the tube therein.

2. Background Information

Air springs are well known in the art and usually comprise an elastomeric or resilient sleeve or bellows which is mounted between a pair of support members for maintaining the members at a predetermined spacing and/or for absorbing shock exerted on these members, which usually are mounted on a vehicle or other type of equipment. The air spring consists of a flexible cylindrical wall which is sealed at the ends, either by integrally formed end walls or by separate end sealing members which are secured in a fluid tight relationship within the open ends of the resilient sleeve, to form an internal fluid chamber. The chamber is filled with a fluid, usually air, to provide the spring damping and to raise or lower the axial separation between the end members depending upon the load supported thereby. Certain of these springs are mounted within a coil spring which assists in absorbing much of the load and forces exerted thereon.

These prior art air springs are provided with a connector or valve assembly for supplying air into the fluid chamber. These valves may have an internal sealing spring such as found on vehicle intertubes and are connected to a usual air hose for filling the air chamber with air. Other connectors receive a tube which extends between the air spring and a remote source of pressurized air. Currently, these valves and connectors are either molded into the end wall of the air spring and are adapted to be inflated as is a standard pneumatic tire, or have an exposed barbed connection for slidably telescopically receiving the tube by a force fit connection thereon. However, with certain of these barbed fittings it is difficult to install the tubing over it, and if the air spring fails the tubing has to be cut off the fitting. Likewise, the tubing does not rotate with respect to the air spring which can create stress on the connector and/or tube possibly resulting in premature failure. Accordingly, there is a desire in the air spring art for a simple connector for connecting to an air tube in a simple efficient and effective manner and which is easy to repair or replace than heretofore possible with barbed type connectors or screw on valve stem type connectors.

There are numerous connectors referred to as push-pull type connectors wherein a tube or other member is inserted into an opening of the connector and then when pulled in the opposite direction locks the tube in place. Examples of such connectors are shown in U.S. Pat. Nos. 4,906,028; 5,090,741; 5,125,694; 5,174,611; 5,230,539; 5,468,028; 5,474,336; 5,511,830; 5,584,513; 5,681,061; 5,683,120 and 5,722,696. However, these prior art connectors are for various applications, none of which are remotely suggestive or related to air springs, but are used in connecting various hoses or tubes either together such as in the midline of a conduit or to a vehicle air brake line or in an air conditioning system.

SUMMARY OF THE INVENTION

Objectives of the invention include providing an improved air spring and in particular a push-pull connector therefor which is molded into an end wall of the air spring and is adapted to rapidly and conveniently receive and provide a secure fluid tight connection with a tube upon insertion of the tube into an opening in the connector.

A further objective of the invention is to provide such an air spring and push-pull connector therefor in which an end of a tube is securely gripped upon insertion into the connector by a plurality of flexible fingers having one way gripping bars mounted on free ends of the fingers; and in which the fingers are formed on a collet which is rotatably mounted in a main body portion of the connector thereby enabling the tube and collet to rotate to compensate for various uneven forces exerted on the tube, connector and/or air spring thereby reducing possible damage thereto and extending service life of the air spring connector and associated tubing.

Still another objective of the invention is to provide such an air spring and push-pull connector therefor which provides both for ease of connection and disconnecting of the tubing from the connector and which is able to withstand the various operating pressures exerted thereon, and which provides a fluid tight connection between the connector and supply tube by use of a simple sealing O-ring eliminating any additional sealant or mechanical air valve as used in many prior art air springs.

A further objective of the invention is to provide such an improved air spring and push-pull connector therefor which can be completely assembled at the time of manufacture of the air spring requiring only the insertion of the air supply tube therein after the air spring has been mounted on the vehicle or other equipment.

These objectives and advantages are obtained by the improved air spring of the present invention, the general nature of which may be stated as being an air spring adapted to extend between two spaced support components in a spaced relation; said air spring including a pair of end walls adapted to be mounted adjacent the pair of support components; a flexible sleeve formed of a resilient material sealingly engaged with the end walls and forming a fluid chamber therebetween; an opening formed in one of the end walls providing fluid access into the fluid chamber; a push-pull connector mounted in the said end wall opening for receiving a tube therein for supplying fluid into the fluid chamber, said connector including a main body member secured within the said end wall opening having an internal tube support sleeve defining an internal bore and a tube receiving space extending about the sleeve; a collet member rotatably mounted within the main body and having a plurality of flexible fingers located radially outwardly of the tube support and communicating with the tube receiving space; gripping projections formed on the flexible fingers and extending toward the tube receiving space for gripping an end of a tube when received in said tube receiving space; and a seal member communicating with the tube receiving space to provide sealing engagement with said tube when received in said space.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a side elevational view with portions broken away and in section, showing an air spring mounted within a coil spring in a no load condition between a pair of end supports and having the push-pull connection formed therein;

FIG. 4 is a plan view of the push-pull connector in an assembled condition in the air spring without a tube mounted therein.

Similar numerals refer to similar parts throughout the drawings.

DESCRIPTION OF THE PREFERRED EMBODIMENT

Figure 2:
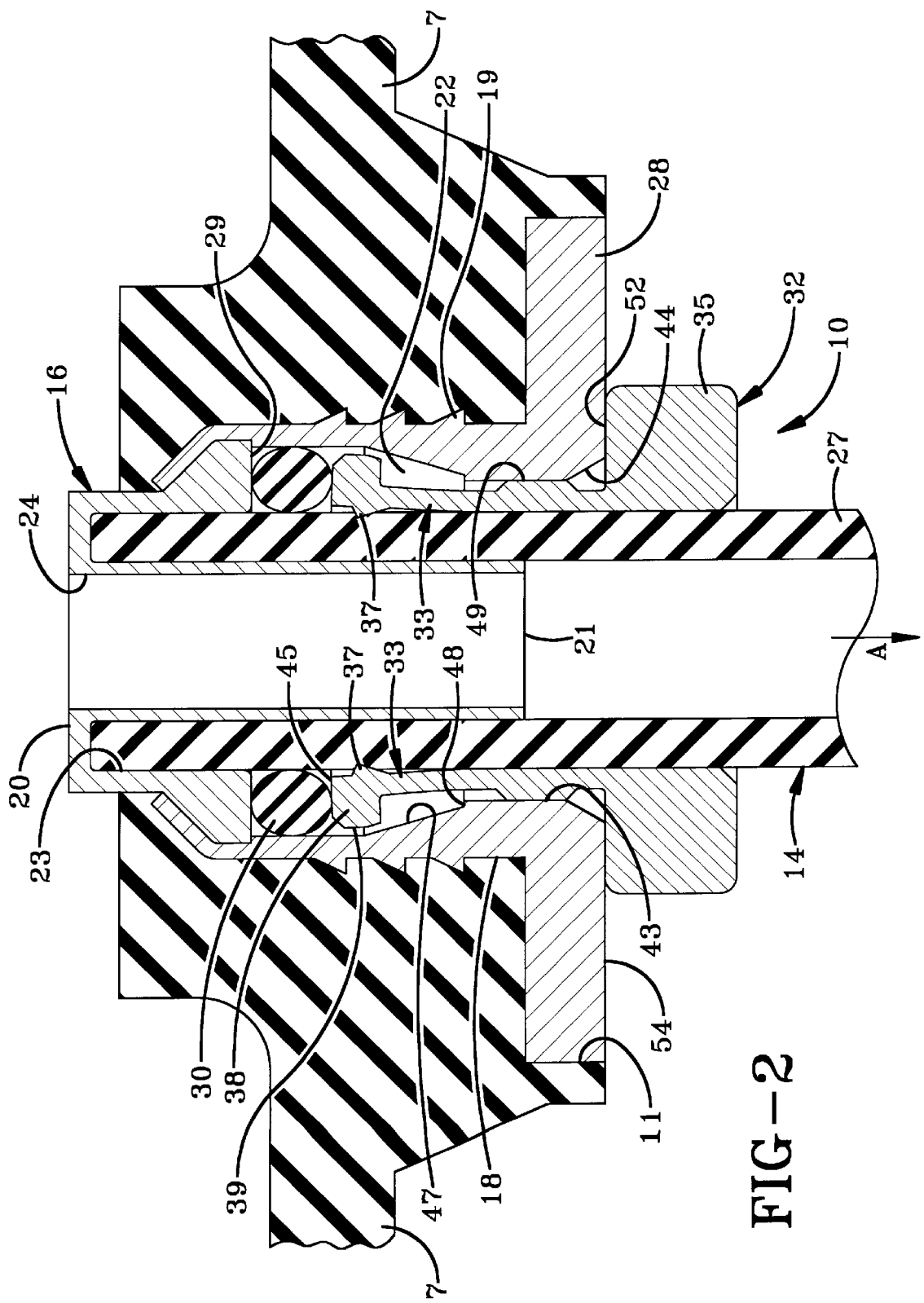
FIG. 2 is a greatly enlarged fragmentary sectional view of the push-pull connector mounted within the end of the air spring of FIG. 1.

The improved air spring of the present invention is indicated generally at 1, and is shown in an assembled no load condition in FIG. 1 mounted between a pair of end supports 2 and 3 and incorporated within a coil spring 4. However, it should be understood that the air spring of the present invention could be of the type shown in U.S. Pat. Nos. 5,707,045; 4,564,177; 4,787,606; 4,787,608; 4,798,369; 4,899,995; and 5,374,037, or other similar constructions, wherein the flexible sleeve or bellows is open at both ends and sealingly closed by a pair of separate end members, which members in turn are then attached to spaced support components without affecting the concept of the invention.

The particular air spring shown in the drawings and described below is an integral one-piece member formed of a flexible material such as neoprene, although it could be formed of other types of resilient or elastomeric materials. Spring 1 includes a generally cylindrical sidewall 6 and a pair of spaced end walls 7 and 8 which are formed integrally with sidewall 6 and which form a hollow interior or pressure chamber 9 which is filled with a fluid, which usually is air.

In accordance with the invention, a push-pull connector indicated generally at 10, is mounted in an opening 11 (FIG. 2) formed in end wall 7 of spring 1 and aligns with the opening for controlling the flow of air into and out of fluid chamber 9. Connector 10 is referred to as a push-pull connector, describing its particular function that when a tube 14 is pushed into the connector and then pulled slightly in the opposite direction it will grip and lock the tube within the connector without requiring any further manipulation of the connector or additional attachment devices and/or elements to retain the tube in a fixed fluid tight seal therein.

Figure 3:
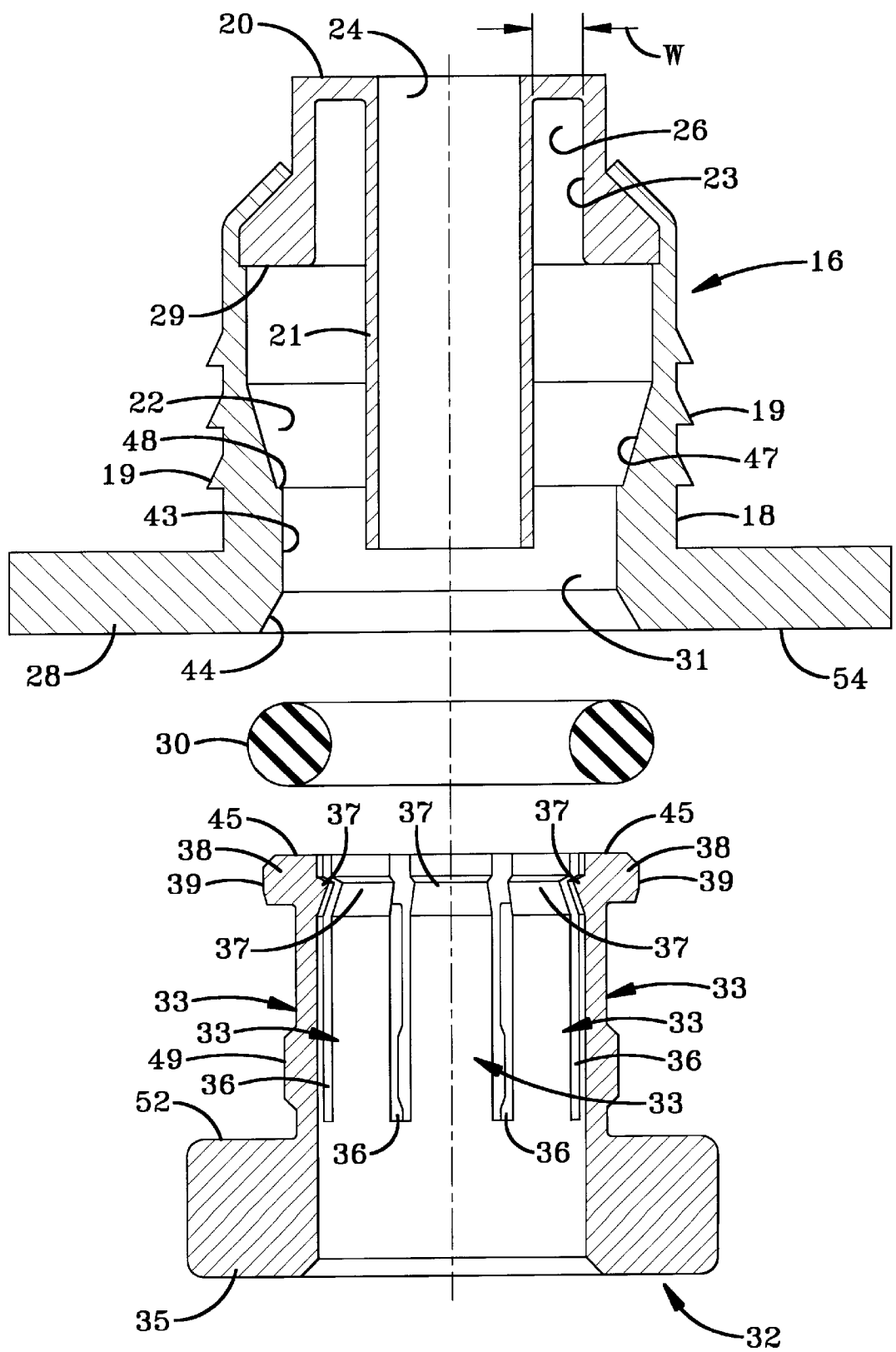
FIG. 3 is a greatly enlarged exploded sectional view of the push-pull connector removed from the air spring.

One type of connector 10 is shown in FIGS. 2–4 and is similar to many other types of push-pull connectors used for completely different applications in various industries. Some examples of such connectors are shown in U.S. Pat. Nos. 4,906,028; 5,090,741; 5,125,694; 5,174,611; 5,230,539; 5,468,028; 5,474,336; 5,511,830; 5,584,513; 5,681,061; and 5,722,696, and more particularly U.S. Pat. No. 5,683,120. However, these prior art push-pull connectors are used for completely different applications such as connecting one tube to another tube in a midline application wherein one of the tubes may be molded integrally with the connector body or bonded thereto, and then the second tube being inserted into the open end of the push-pull connector. However, none of these prior art push-pull connectors are used as a member permanently embedded or molded into the end of an air spring providing the desired advantages as those achieved by the present invention.

Connector 10 preferably is formed of metal but can be formed of a rigid plastic material such as certain types of PTC without effecting the concept of the invention. Connector 10 includes a main body 16 which may be a single piece or a two-piece construction as shown in FIGS. 2–4. Body 16 includes an outer annular wall 18 having a plurality of annular ribs or barbs 19 formed thereon so that when molded within opening 11 of end wall 7 it will bond securely to the adjacent material of the air spring. Body 16 further includes an inner or bottom wall 20 and has a cylindrical tube support sleeve 21 extending axially therefrom and projecting within the hollow interior 22 of body 16. Sleeve 21 forms an internal cylindrical bore 24 and an outer annular tube receiving space 26 which will have a radial width W generally complementary to and just slightly larger than the thickness of cylindrical wall 27 which forms tube 14. Tube receiving space 26 is located between a portion of the outer surface of sleeve 21 and a cylindrical internal wall 23 of main body 16. An annular shoulder or radial ledge 29 is formed within hollow interior 22 of body 16 and provides a seat for an elastomeric sealing O-ring 30. The opposite end of body 16 from bottom wall 20 terminates in an annular outwardly extending radial collar 28 which surrounds an end opening 31 which communicates with hollow interior 22.

A separate collet member indicated generally at 32, is slidably rotatably mounted within hollow interior 22 of body 16 as shown in FIG. 2. Collet 32 (FIGS. 2 and 3) includes a plurality of flexible legs or fingers 33 which extend in a cantilever fashion from an annular end collar 35. Eight flexible fingers 33 are shown in the drawings for collet 32 but this number could vary without affecting the concept of the invention. The fingers are separated from each other by axially extending slots 36. Each flexible finger 33 has an inwardly projecting barb 37 and an outwardly extending projection 38 formed on the free end of the finger, the functions of which are discussed below.

Collet 32 is inserted into hollow interior 22 of main body 16 by slightly compressing fingers 33 inwardly so that flat outer surfaces 39 of finger projections 38 abut and press against an annular surface 43 which forms end opening 31 of body 16 together with a tapered section 44. Fingers 33 have flat end surfaces 45 which compress O-ring 30 against shoulder 29.

Main body 16 is easily assembled within opening 11 of end wall 7 by first bead blasting the outer surface 18 of body 16 and then applying a bonding cement thereto. Preferably body 16 is preheated and then placed into an injection mold wherein the air spring is molded about connector body 16. Collet 32 is formed by usual molding or metal forming techniques at a location remote from that in which the air spring is formed and molded with body 16. As described above, collet 32 is merely pressed into main body opening 31 upon the inward flexure of flexible fingers 33. Once inserted within the hollow interior of body 16, the fingers will flex slightly outwardly to retain the collet therein. End projections 38 will slide along a conical stop surface 47 formed within body 16 when tube 14 is moved in an outward axial direction as shown by arrow A (FIG. 2), which prevents the fingers from spreading sufficiently outwardly to release the gripping action of barbs 37 which are slightly embedded within the outer surface of tube 14. Conical surface 47 terminates in a small radial shoulder 48 which provides a more positive stop preventing the passage of fingers projections 38 outwardly therebeyond.

In accordance with another feature of the invention, collet 13 is rotatably mounted with respect to body 16 as best shown in FIG. 2 wherein an outer cylindrical surface 49 formed on collet 32, will rotate against annular surface 43 formed adjacent end opening 31. Likewise, an annular radially extending inner surface 52 of annular end collar 35 will rotate against a flat outer annular surface 54 of radial collar 28 of main body 16.

Thus, after the snap fitting of collet 32 within main body 16 of the air spring, tube 14 is then inserted inwardly in an axial direction opposite that of arrow A (FIG. 2) into tube receiving space 26 until it bottoms out against bottom wall 20. A slight axial pull in the direction of arrow A will seat barbs 37 into the outer surface of tube wall 27 to lock tube 14 in position.

Accordingly, the improved air spring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved air spring is constructed and used, the characteristics of the construction, and the advantageous, new and useful results obtained, the new and useful structures, devices, elements, arrangements, parts and combinations, are set forth in the appended claims.

I claim:

1. An air spring adapted to extend between two spaced support components so as to yieldly maintain said components in a spaced relation; said air spring including:
   a flexible sleeve and at least a first end wall forming a one-piece member of a resilient material;
   a second end wall opposite of said first end wall and sealingly engaged with the flexible sleeve and forming a fluid chamber;
   an opening formed in said first end wall providing fluid access into the fluid chamber;
   a push-pull connector mounted in the said first end wall opening for receiving a tube therein for supplying fluid into the fluid chamber, said connector including:
   a) a main body member formed of metal and molded to said first end wall within said opening having an internal bore and a tube receiving space;
   b) a collet member rotatably mounted within the main body and having a plurality of flexible fingers communicating with the tube receiving space; and
   c) gripping projections formed on the flexible fingers and extending toward the tube receiving space for gripping an end of a tube when received in said tube receiving space.

2. The air spring defined in claim 1 including a coil spring extending about the resilient sleeve.

3. The air spring defined in claim 1 in which the resilient sleeve and first end wall is formed of urethane.

4. The air spring defined in claim 1 in which the main body is formed with an internal shoulder extending inwardly toward the tube support sleeve; and in which a seal member is located between said internal shoulder and surfaces formed on outer ends of certain of the flexible fingers.

5. The air spring defined in claimed 4 in which the seal member is an elastomeric O-ring.

6. The air spring defined in claim 1 in which the collet includes a radial collar which is rotatably mounted with respect to a radially extending collar formed on the main body of the connector.

7. The air spring defined in claim 1 in which the flexible fingers are arranged in a generally cylindrical configuration radially outwardly of the support sleeve.

8. The air spring defined in claim 1 in which a conical stop surface is formed within the main body; and in which projections are formed on the fingers and engage said stop surface to prevent removal of the collet from within the main body.

9. The air spring defined in claim 1 in which the second end wall is formed integrally with the flexible sleeve forming a one-piece member in combination with said sleeve and said first end wall; and in which said end walls and sleeve are formed of urethane.

10. The air spring defined in claim 1 in which an internal support is formed within the main body member and forms the internal bore and tube receiving space.

11. An air spring adapted to extend between two spaced support components so as to yieldly maintain said components in a spaced relation; said air spring including:
   an integral one piece member formed of a flexible material including a pair of end walls and an intervening sleeve forming a fluid chamber therebetween;
   an end wall opening formed in one of the end walls providing fluid access into the fluid chamber; and
   a push-pull connector mounted in the said end wall opening for receiving a tube therein for supplying fluid into the fluid chamber, said connector including a main body formed of metal molded to said one wall within the end wall opening and having an internal tube receiving space, and gripping projections extending toward the tube receiving space for gripping an end of a tube when received in said tube receiving space.

12. The air spring defined in claim 11 in which the connector includes a collet rotatably mounted within the main body; in which the collet includes a plurality of flexible fingers; and in which the gripping projections are formed on the flexible fingers.

13. The air spring defined in claim 12 in which the main body includes an internal tube support sleeve defining an internal bore and the tube receiving space between said sleeve and the collet.

14. The air spring defined in claim 13 in which stop projections are formed on the flexible fingers and engage a stop surface formed on the collet to retain said collet within the main body.

15. The air spring defined in claim 13 in which a seal ring is mounted in the tube receiving space to provide sealing engagement with the tube when received in said space.

* * * * *